United States Patent
Chen et al.

(10) Patent No.: US 11,182,233 B2
(45) Date of Patent: Nov. 23, 2021

(54) METHOD FOR EVENT LOG MANAGEMENT OF MEMORY ERRORS AND SERVER COMPUTER UTILIZING THE SAME

(71) Applicant: MITAC COMPUTING TECHNOLOGY CORPORATION, Taoyuan (TW)

(72) Inventors: Rui-Guang Chen, Hsinchu (TW); Chuan-Chieh Wang, Hsinchu (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 16/850,899

(22) Filed: Apr. 16, 2020

(65) Prior Publication Data

US 2020/0341831 A1 Oct. 29, 2020

(30) Foreign Application Priority Data

Apr. 25, 2019 (TW) ................. 108114420

(51) Int. Cl.
  *G06F 11/07* (2006.01)
  *G06F 11/30* (2006.01)

(52) U.S. Cl.
  CPC ........ *G06F 11/0772* (2013.01); *G06F 11/073* (2013.01); *G06F 11/076* (2013.01); *G06F 11/0781* (2013.01); *G06F 11/0787* (2013.01); *G06F 11/3037* (2013.01)

(58) Field of Classification Search
  CPC .. G06F 11/073; G06F 11/076; G06F 11/0766; G06F 11/0772; G06F 11/0778; G06F 11/0781; G06F 11/0787; G06F 11/3037; G06F 11/3065; G06F 11/3072; G06F 11/3079; G06F 10/3082; H04L 43/02; H04L 43/022; H04L 43/028
  See application file for complete search history.

(56) References Cited

U.S. PATENT DOCUMENTS

| | | | |
|---|---|---|---|
| 10,599,505 B1 * | 3/2020 | Hijazi | G06F 11/3072 |
| 2002/0124214 A1 * | 9/2002 | Ahrens, Jr. | G06F 11/0712 |
| | | | 714/57 |
| 2005/0182879 A1 * | 8/2005 | Vu | G06F 13/24 |
| | | | 710/260 |
| 2008/0141077 A1 * | 6/2008 | Swanson | G06F 11/008 |
| | | | 714/48 |
| 2008/0320045 A1 * | 12/2008 | McEnroe | G06F 11/0781 |
| 2009/0012748 A1 * | 1/2009 | Beish | G06F 11/366 |
| | | | 702/187 |
| 2017/0091013 A1 * | 3/2017 | Tallam | G06F 11/0772 |
| 2017/0344419 A1 * | 11/2017 | Watkins | G06F 11/0781 |

(Continued)

*Primary Examiner* — Gabriel Chu
(74) *Attorney, Agent, or Firm* — Lewis Roca Rothgerber Christie LLP

(57) ABSTRACT

A method for recording memory errors includes the following steps: upon detecting a current correctable error that occurred in a volatile memory device, determining whether a count value corresponding to the current correctable error exceeds a predetermined value; and when it is determined that the count value corresponding to the current correctable error thus detected does not exceed the predetermined value, sending update event information corresponding to the current correctable error to a BMC, in order for the BMC to record information of the current correctable error.

18 Claims, 3 Drawing Sheets

(56) References Cited

U.S. PATENT DOCUMENTS

2018/0157525 A1* 6/2018 Song .................... G06F 11/0772
2018/0288126 A1* 10/2018 Smart ..................... H04L 43/08
2019/0026239 A1* 1/2019 Chalfant ............. G06F 11/0772
2019/0310908 A1* 10/2019 Huang ................ G06F 11/0772

* cited by examiner

| record region | | | | |
|---|---|---|---|---|
| S/N of central control unit | S/N of memory control unit | S/N of channel | S/N of volatile memory device | error count | time |

FIG. 2

METHOD FOR EVENT LOG MANAGEMENT OF MEMORY ERRORS AND SERVER COMPUTER UTILIZING THE SAME

CROSS-REFERENCE TO RELATED APPLICATION(S)

This application claims priority of Taiwanese Patent Application Number 108114420, filed on Apr. 25, 2019, the entire contents of which are incorporated herein by reference.

FIELD

The disclosure relates to memory errors, and more particularly to a method for recording memory errors and a server computer utilizing the same.

BACKGROUND

A conventional server computer is provided with error-correcting code (ECC) memory, of which memory errors may be detected and may even be corrected by using ECC technology. When a memory error occurs in the ECC memory and is detected by a central processing unit (CPU) of the conventional server computer, a System Management Interrupt (SMI) is triggered in order for the CPU to enter the System Management Mode (SMM) to handle the error. When the memory error is a correctable error, the error is corrected in the SMM, and information of the correctable error is sent to a Baseband Management Controller (BMC) of the conventional server computer in order to be recorded in an error log maintained by the BMC. When a same error frequently occurs within a short period of time, the CPU and the BMC have to frequently and repeatedly send and record error information for the same error. In this case, not only are system resources such as the CPU and available storage space for logging system events heavily consumed, but chances of errors occurring in execution threads of the operating system (OS) are also increased because of increased time of the CPU staying in the SMM.

SUMMARY

Therefore, an object of the disclosure is to provide a method that may record memory errors in an efficient way while reducing associated negative effects on system resources and/or system performance, and a server computer utilizing the method.

According to one aspect of the disclosure, the method is to be performed by a processing module of a server computer, the server computer further including a volatile memory device and a baseboard management controller (BMC) that are electrically connected to the processing module. The method includes the following steps: upon detecting a current correctable error that occurred in the volatile memory device, determining whether a count value corresponding to the current correctable error exceeds a predetermined value; and when it is determined that the count value corresponding to the current correctable error thus detected does not exceed the predetermined value, sending update event information corresponding to the current correctable error to the BMC, in order for the BMC to record information of the current correctable error.

According to one aspect of the disclosure, the server computer includes a volatile memory device, a baseboard management controller (BMC), and a processing module. The processing module is electrically connected to the volatile memory device and to the BMC, and is configure to determine, upon detecting a current correctable error occurred in the volatile memory device, whether a count value corresponding to the current correctable error exceeds a predetermined value. The processing module is also configured to send, when it is determined that the count value corresponding to the current correctable error thus detected does not exceed the predetermined value, update event information corresponding to the current correctable error to the BMC. The BMC is configured to record information of the current correctable error in response to receiving the update event information from the processing module.

BRIEF DESCRIPTION OF THE DRAWINGS

Other features and advantages of the disclosure will become apparent in the following detailed description of the embodiment(s) with reference to the accompanying drawings, of which:

FIG. 2 is a schematic view that exemplarily illustrates content of a record region according to an embodiment of the disclosure.

DETAILED DESCRIPTION

Figure 1:
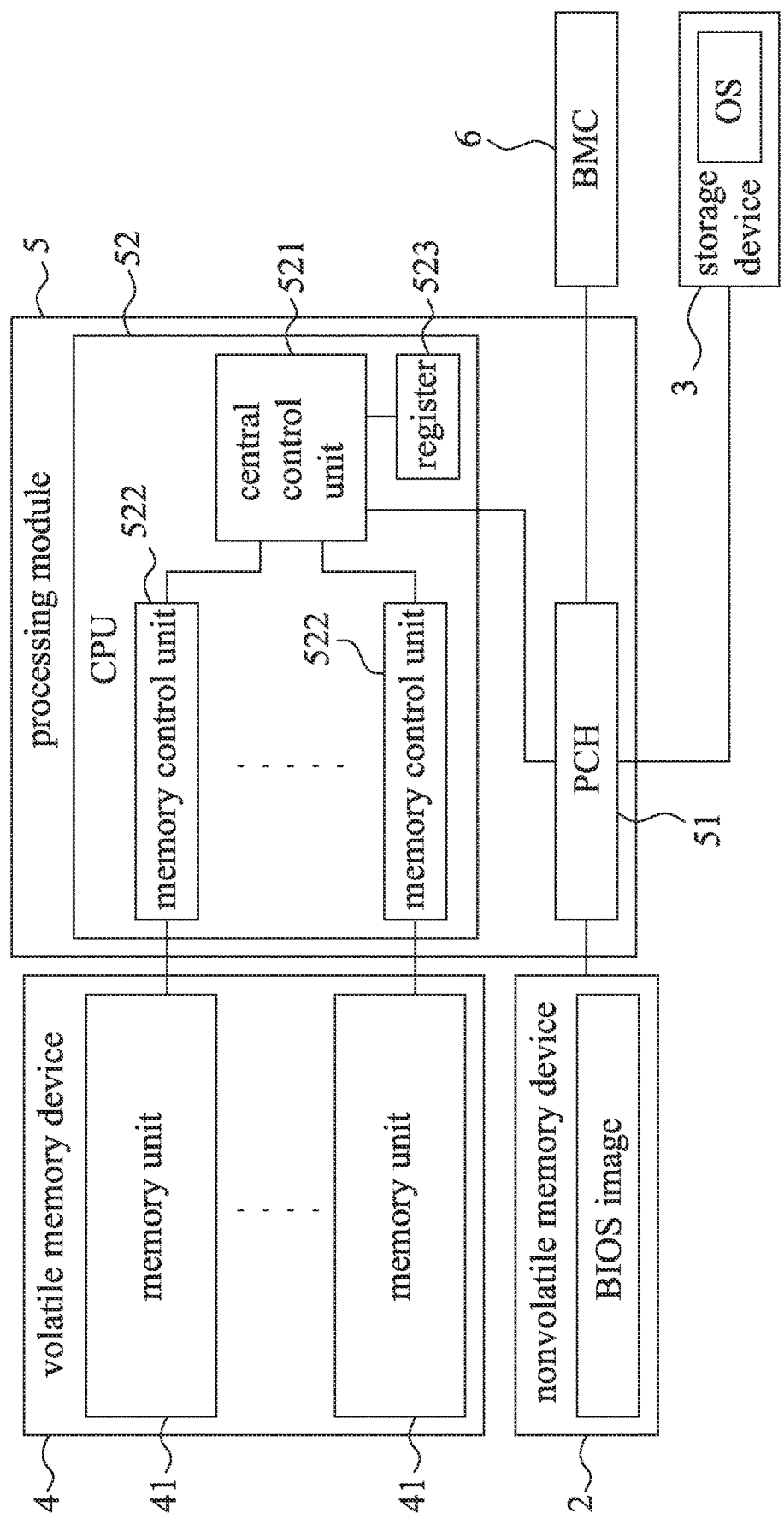
FIG. 1 is a block diagram that exemplarily illustrates a server computer according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 exemplarily illustrates a server computer according to an embodiment of the disclosure. The server computer includes a processing module 5, and a nonvolatile memory device 2, a storage device 3, a volatile memory device 4 and a baseboard management controller (BMC) 6 that are electrically connected to the processing module 5. The nonvolatile memory device 2 stores a basic input/output system (BIOS) image file. The storage device 3 stores an operating system (OS). According to some embodiments, the storage device 3 may be a hard-disk drive (HDD) or a solid-state drive (SSD).

The processing module 5 includes a Platform Controller Hub (PCH) 51 and a central processing unit (CPU) 52 that are electrically connected to each other. The PCH 51 is electrically connected to the nonvolatile memory device 2, the storage device 3 and the BMC 6. The CPU 52 is electrically connected to the volatile memory device 4. According to some embodiments of the disclosure, the processing module 5 may or may not be implemented by a system on chip (SoC) integrating the PCH 51 and the CPU 52.

The volatile memory device 4 includes multiple memory units 41 that may each be, for example, a dual in-line memory module (DIMM), a single in-line memory module (SIMM) or a small outline dual in-line memory module (SO-DIMM). The CPU 52 includes a central control unit 521, and multiple memory control units 522 and a register 523 that are electrically connected to the central control unit 521. The central control unit 521 is electrically connected to the PCH 51, and may access the BIOS image file stored in the nonvolatile memory device 2 and the OS stored in the storage device 3 through the PCH 51 in order to execute the BIOS image file and the OS. The memory control units 522 correspond and are electrically connected to the memory units 41 of the volatile memory device 4, respectively. Each time when a memory control unit 522 accesses its corresponding memory unit 41, error-checking is performed to detect if a memory error has occurred in the memory unit 41. There are two types of memory errors that may occur in the memory units 41, i.e., correctable errors and non-correctable errors.

The volatile memory device 4 has a record block that may be allocated in one or more of the memory units 41. The record block includes multiple record regions corresponding respectively to the memory units 41 for recording information related to memory errors occurred in the memory units 41. Referring to FIG. 2, according to some embodiments of the disclosure, for each of the memory units 41, the record region corresponding to the memory unit 41 may contain information related to a detected memory error that includes a serial number of the central control unit 521, a serial number of the corresponding memory control unit 522, a serial number of a channel connecting the memory unit 41 and the processing module 5, a serial number of the memory unit 41, an error count of the detected memory error that relates to a counted number of detected and recorded memory errors that have occurred in the memory unit 41, and time information representing time of occurrence of the detected memory error. In some embodiments, the record region corresponding to the memory unit 41 contains information related to a latest recorded memory error.

According to some embodiments of the disclosure, the CPU 52 may include more than one central control unit 521 (i.e., the CPU 52 is a multi-core CPU, with each central control unit 521 being a core thereof), in which case each central control unit 521 is electrically connected to the memory control units 522, the register 523 and the PCH 51. In a case that the CPU 52 includes multiple central control units 521, the serial number of the central control unit 521 stored in the record region corresponding to one memory unit 41 is the serial number of one of the central control units 521 that is related to the detected memory error (i.e., the central control unit 521 that instructed the memory control unit 522 corresponding to said one memory unit 41 to access the memory unit 41 and therefore detected the memory error).

Figure 3:
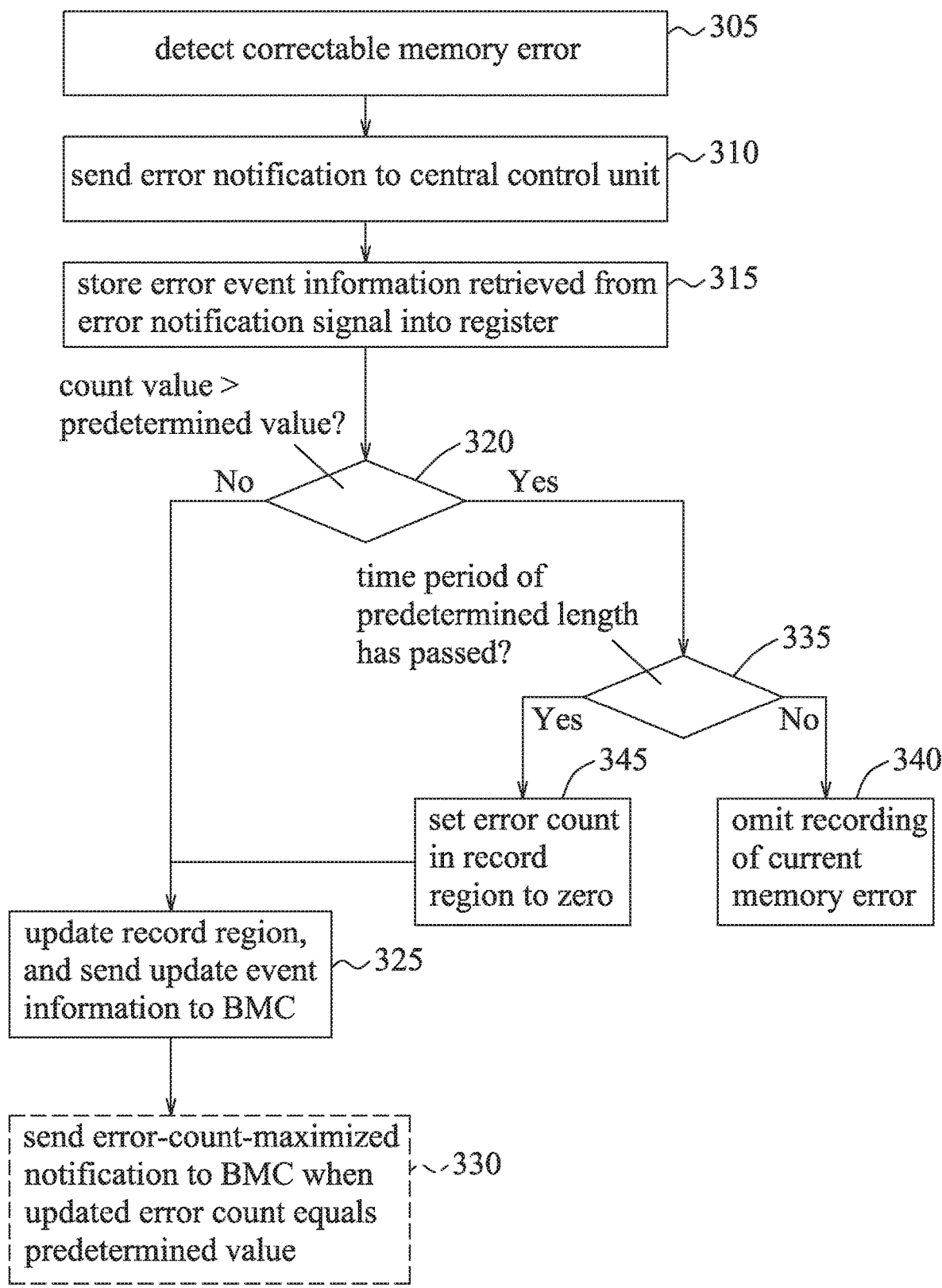
FIG. 3 is a flow chart that exemplarily illustrates a method for recording memory errors according to an embodiment of the disclosure.

FIG. 3 illustrates a flow chart of a method for recording memory errors that may be implemented by the server computer illustrated in FIG. 1 according to an embodiment of the disclosure. Please note that, since the memory control units 522 are configured to operate in the same manner, the method is described with reference to a specific one of the memory control units 522 and the corresponding memory unit 41 in the following description.

Referring FIG. 3, the procedure of the method starts at step 305 where a current memory error that is a correctable error occurred in the memory unit 41 is detected by the memory control unit 522 corresponding to the memory unit 41.

In step 310, the memory control unit 522 generates, upon detecting the current memory error, an error notification related to the current memory error, and sends the error notification signal to the central control unit 521. Specifically, the error notification signal indicates that the current memory error is a correctable error (referred to as "current correctable error" hereinafter). According to some embodiments of the disclosure, the error notification signal is sent to the central control unit 521 along with a System Management Interrupt (SMI).

In step 315, the central control unit 521 receives the error notification signal from the memory control unit 522, retrieves error event information corresponding to the current correctable error from the received error notification signal, and stores the error event information into the register 523. According to some embodiments of the disclosure, the error event information is indicative of whether the current correctable error is a correctable error, and may include the serial number of the central control unit 521, the serial number of the memory control unit 522, the serial number of the channel, and time information representing time of occurrence of the current correctable error. It can be appreciated that the central control unit 521 enters the System Management Mode (SMM) in step 315 in response to receiving the error notification signal sent along with the SMI.

Then, in step 320, the central control unit 521 determines whether a count value corresponding to the current correctable error exceeds a predetermined value. If so, the procedure goes to step 335; otherwise, the procedure goes to step 325. According to some embodiments of the disclosure, the central control unit 521 may obtain the count value corresponding to the current correctable error by reading the error count from the record region corresponding to the memory unit 41 of the volatile memory device 4, and adding one to the error count thus read. In some embodiments, the central control unit 521 determines whether the count value corresponding to the current correctable error exceeds the predetermined value by determining whether the error count thus read is less than the predetermined value. That is, the central control unit 521 determines that the count value corresponding to the current correctable error does not exceed the predetermined value when it is determined that the error count thus read is less than the predetermined value.

According to some embodiments of the disclosure, the predetermined value may be retrieved from BIOS settings of the BIOS image file and be stored into a memory space accessible by the central control unit 521 when the processing module 5 executes the BIOS image file. In an embodiment, the predetermined value is, for example, 3. According to some embodiments, the predetermined value may be altered by a user. For example, the user may locally alter the predetermined value by using the BIOS setup menu, or remotely alter the predetermined value by using a control device connected to the server computer via a network to control the central control unit 521 to alter the predetermined value stored in the memory space.

In step 325, the central control unit 521 updates content of the record region corresponding to the memory unit 41. The content of the record region corresponding to the memory unit 41 to be updated in step 325 includes the error count. In an embodiment of the disclosure, the central control unit 521 updates the error count stored in the record region corresponding to the memory unit 41 by increasing the stored error count by one. The central control unit 521 further updates the content of the record region corresponding to the memory unit 41 based on the error event information stored in the register 523 (including information of the serial number of the central control unit 521, the serial number of the memory control unit 522, the serial number of the channel, and the time information substantially representing time of occurrence of the current correctable error). In one embodiment, the updating of the content of the record region of the memory unit 41 is performed by overwriting corresponding existing content in the record region. In step 325, the central control unit 521 also sends update event information corresponding to the current correctable error to the BMC 6, in order for the BMC 6 to record information of the current correctable error in a log file (e.g., as an event log) stored in a memory space accessible to the BMC 6. The update event information includes the error event information and the count value corresponding to the current correctable error.

The procedure may optionally include step 330 after step 325 (the optional step is characterized by a dashed border in FIG. 3). In step 330, the central control unit 521 determines whether the error count stored in the volatile memory device 4 after being updated (in step 325) equals the predetermined value, and sends an error-count-maximized notification to the BMC 6 only when it is determined that the updated error count equals the predetermined value. In response to receipt of the error-count-maximized notification, the BMC 6 creates and records, in the log file (e.g., the event log), a log entry indicating that a number of correctable errors that have occurred in the memory unit 41 of the volatile memory device 4 has reached the predetermined value, and temporarily halts memory error recording. In this way, a user may conveniently obtain, by reviewing log entries of the log file through the BMC 6, an exact time point when recording of correctable memory error in the volatile memory device 4 is omitted/halted.

On the other hand, in step 335 to which the procedure goes when it is determined in step 320 that the count value corresponding to the current correctable error of the memory unit 41 exceeds the predetermined value, the central control unit 521 determines whether a time period from the time represented by the time information stored in the record region corresponding to the memory unit 41 to a time point when the current correctable error was detected exceeds a predetermined length. If so, the procedure goes to step 345; otherwise, the procedure goes to step 340. In an embodiment of the disclosure, the predetermined length is 10 minutes. It can be appreciated that the time information stored in the record region corresponding to the memory unit 41 represents a time point when a latest memory error that occurred in the memory unit 41 and that was recorded in said record region was detected (i.e., a previous correctable error corresponding to latest update event information that is related to the memory unit 41 and that has been sent to the BMC 6).

In step 340, recording of the current memory error is omitted. That is, memory recording is halted. Content of the record region corresponding to the memory unit 41 would not be altered in response to detection of the current correctable error, and the current correctable error would not be recorded (in the log file) by the BMC 6.

On the other hand, in step 345, the central control unit 521 sets the error count stored in the record region corresponding to the memory unit 41 of the volatile memory device 4 to zero. Then, the procedure goes to step 325. However, according to some embodiments of the disclosure, after step 345, the procedure may go step 320 instead of step 325.

In summary, the method for recording memory errors as illustrated in FIG. 3 mainly includes three stages: i) once a correctable memory error is detected, storing error event information relating to the correctable memory error in the register 523 (step 315); ii) making a decision as to whether the correctable memory error should be recorded in the volatile memory device 4 and the log file (e.g., as an event log) that is managed by the BMC 6 (step 320); and iii) making a decision as to whether a temporal halt on memory error recording in the volatile memory 4 should be terminated (i.e., whether memory error recording in the volatile memory 4 should be restarted) (step 335). It can be perceived that in the disclosed method, when multiple correctable memory errors occur in the same memory unit 41 within a certain time period (i.e., the memory unit 41 is considered to have erred frequently in the time period), at most, only the predetermined number of these memory errors would be recorded in the record region corresponding to the memory unit 41 and in the log file managed by the BMC 6. In this way, the disclosed method may reduce system resources consumed for recording memory errors. Such reduction of system resource helps prevent the server computer from crashing, minimizes interference to execution threads of the OS and BIOS, and saves storage space of the BMC 6.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for recording memory errors to be performed by a processing module of a server computer, the server computer further including a volatile memory device and a baseboard management controller (BMC) that are electrically connected to the processing module, the method comprising the following steps of:

upon detecting a current correctable error that occurred in the volatile memory device, determining whether a count value corresponding to the current correctable error exceeds a predetermined value; and when it is determined that the count value corresponding to the current correctable error thus detected does not exceed the predetermined value, sending update event information corresponding to the current correctable error to the BMC, in order for the BMC to record information of the current correctable error, the update event information including the count value corresponding to the current correctable error.

2. The method of claim 1, the processing module including a memory control unit and a central control unit, the method further comprising the following steps of:

generating, by the memory control unit, an error notification signal upon detecting a current memory error, the error notification signal indicating that the current memory error thus detected is a correctable error;

sending, by the memory control unit, the error notification signal thus generated to the central control unit; and upon receiving the error notification signal from the memory control unit, by the central control unit, determining that the current memory error thus detected is a correctable error based on the error notification signal, and implementing the step of determining whether a count value corresponding to the current correctable error exceeds a predetermined value with the current memory error serving as the current correctable error.

3. The method of claim 2, the processing module further including a register, wherein the method further comprises the following steps of:

retrieving, by the central control unit, error event information corresponding to the current correctable error from the error notification signal received from the memory control unit; and storing, by the central control unit, the error event information thus retrieved into the register.

4. The method of claim 2, the volatile memory device including a record region storing an error count, the processing module further including a register, wherein the step of determining whether a count value corresponding to the current memory error exceeds a predetermined value includes the following sub-steps of:

reading the error count from the volatile memory device; and determining whether the error count thus read is less than the predetermined value, wherein, when it is determined that the error count is less than the predetermined value, it means that the count value corresponding to the current memory error does not exceed the predetermined value.

5. The method of claim 2, wherein the step of sending the error notification signal includes sending the error notification signal thus generated to the central control unit along with a System Management Interrupt (SMI).

6. The method of claim 1, the volatile memory device including a record region storing an error count, the method further comprising the following steps of:

when it is determined that the count value corresponding to a current memory error thus detected does not exceed the predetermined value, updating the error count stored in the volatile memory device, and determining whether the error count stored in the volatile memory device after being updated equals the predetermined value.

7. The method of claim 6, wherein the step of updating the error count stored in the volatile memory device includes updating the error count stored in the volatile memory device by increasing the error count by one.

8. The method of claim 6, further comprising the following step of:

when it is determined that the error count stored in the volatile memory device after being updated equals the predetermined value, sending an error-count-maximized notification to the BMC, in order for the BMC to create and record a log entry indicating that a number of correctable errors that have occurred in the volatile memory device has reached the predetermined value, and to temporarily halt memory error recording.

9. The method of claim 1, the volatile memory device including a record region storing an error count, the method further comprising the following steps of:

when it is determined that the count value corresponding to a current memory error thus detected exceeds the predetermined value, determining whether a time period from a time point when a previous correctable error corresponding to latest update event information that has been sent to the BMC was detected to a time point when the current correctable error was detected exceeds a predetermined length; and when it is determined that the time period exceeds the predetermined length, setting the error count stored in the volatile memory device to zero.

10. A server computer, comprising:

a volatile memory device;

a baseboard management controller (BMC); and a processing module that is electrically connected to said volatile memory device and to said BMC, and that is configure to upon detecting a current correctable error occurred in said volatile memory device, determine whether a count value corresponding to the current correctable error exceeds a predetermined value, and when it is determined that the count value corresponding to the current correctable error thus detected does not exceed the predetermined value, send update event information corresponding to the current correctable error to said BMC, the update event information including the count value corresponding to the current correctable error;

wherein said BMC is configured to record information of the current correctable error in response to receiving the update event information from said processing module.

11. The server computer of claim 10, wherein said processing module includes:

a central control unit; and a memory control unit that is electrically connected to said memory control unit, and that is configured to generate an error notification signal upon detecting a current memory error, the error notification signal indicating that the current memory error thus detected is a correctable error, and send the error notification signal thus generated to said central control unit;

wherein said central control unit is configured, upon receiving the error notification signal from said memory control unit, to determine that the current memory error is a correctable error based on the error notification signal, and to determine whether the count value corresponding to the current correctable error exceeds the predetermined value with the current memory error serving as the current correctable error.

12. The server computer of claim 11, wherein:

the error notification signal sent from said memory control unit to said central control unit includes error event information corresponding to the current correctable error;

said processing module further includes a register electrically connected to said central control unit; and said central control unit is further configured to retrieve the error event information from the error notification signal received from said memory control unit, and to store the error event information thus retrieved into said register.

13. The server computer of claim 11, wherein:

said volatile memory device includes a record region storing an error count;

said processing module further includes a register electrically connected to said central control unit; and said central control unit is further configured to read the error count from said volatile memory device, and to determine that the count value corresponding to the current memory error does not exceed the predetermined value when the error count thus read is less than the predetermined value.

14. The server computer of claim 11, wherein said memory control unit is configured to send the error notification signal to said central control unit along with a System Management Interrupt (SMI).

15. The server computer of claim 10, wherein:

said volatile memory device includes a record region storing an error count; and said processing module is further configured, when it is determined that the count value corresponding to a current memory error thus detected does not exceed the predetermined value, to update the error count stored in said volatile memory device, and to determine whether the error count stored in said volatile memory device equals the predetermined value after updating the error count.

16. The server computer of claim 15, wherein said processing module is configured to update the error count stored in said volatile memory device by increasing the error count by one.

17. The server computer of claim 15, wherein:

said processing module is further configured, when it is determined that the error count stored in said volatile memory device equals the predetermined value, to send an error-count-maximized notification to said BMC; and said BMC is further configured, in response to receiving the error-count-maximized notification from said processing module, to create and record a log entry indicating that a number of correctable errors that have occurred in said volatile memory device has reached the predetermined value, and to temporarily halt memory error recording.

18. The server computer of claim 10, wherein:

said volatile memory device includes a record region storing an error count; and said processing module is further configured to when it is determined that the count value corresponding to a current memory error exceeds the predetermined value, determine whether a time period from a time point when a previous correctable error corresponding to latest update event information that has been sent to said BMC was detected to a time point when the current correctable error was detected exceeds a predetermined length, and when it is determined that the time period exceeds the predetermined length, set the error count stored in said volatile memory device to zero.

* * * * *